UNITED STATES PATENT OFFICE.

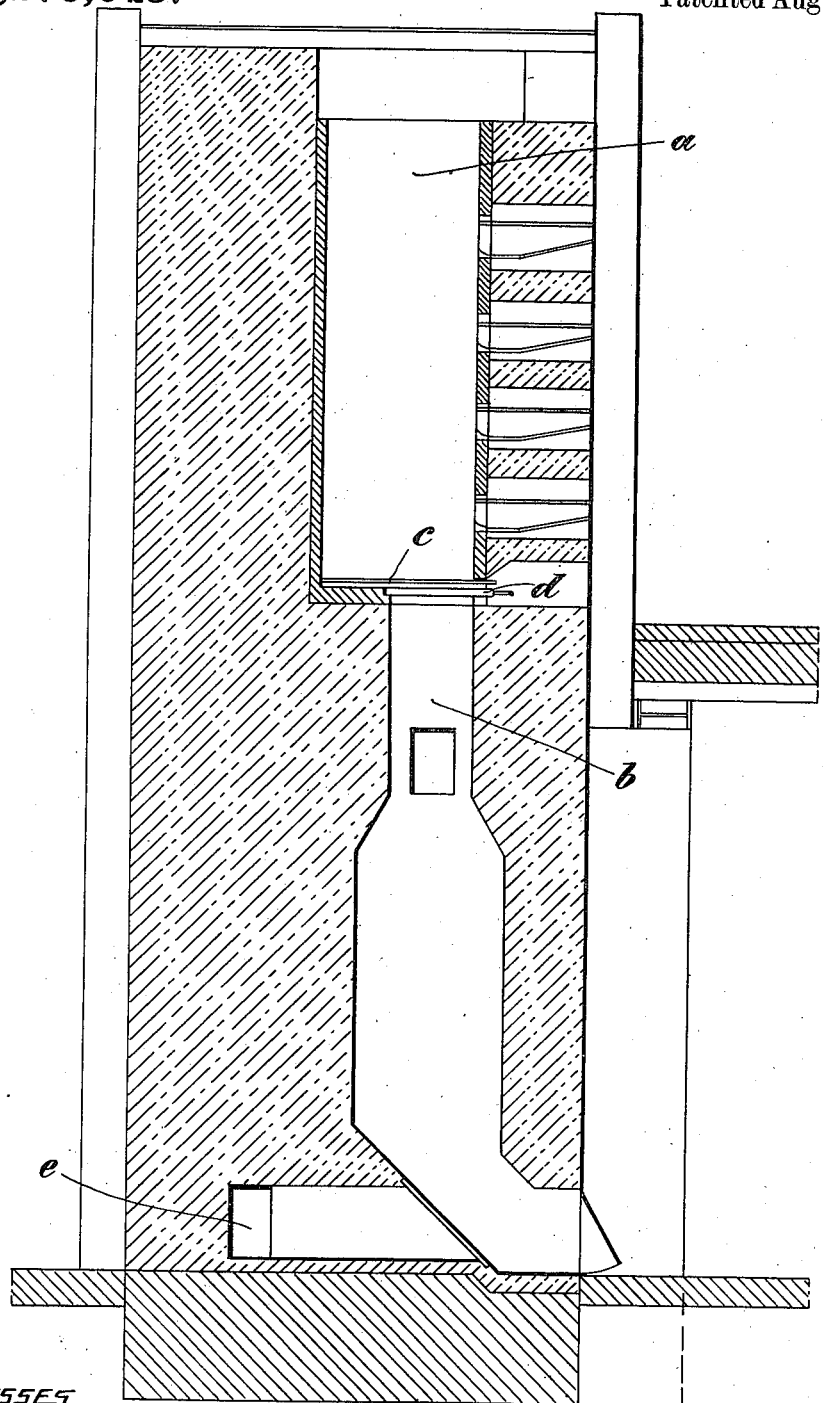

RUDOLF KÖHLER AND OTTO BALTIN, OF LIPINE, GERMANY.

PROCESS FOR UTILIZING THE RESIDUES OBTAINED IN THE DISTILLATION OF ZINC.

1,275,045.  Specification of Letters Patent.  Patented Aug. 6, 1918.

Application filed January 3, 1914. Serial No. 810,168.

*To all whom it may concern:*

Be it known that we, RUDOLF KÖHLER and OTTO BALTIN, citizens of the German Empire, and residents of Lipine, Upper Silesia, Germany, have invented certain new and useful Improvements in Processes for Utilizing the Residues Obtained in the Distillation of Zinc, of which the following is a specification, such as will enable others skilled in the art to which it appertains to make and use the same.

This invention relates to the smelting of zinc. A characteristic feature of modern zinc smelting is that after the processes of reduction and distillation have been completed, the residues are either thrown away as worthless or are subjected to a further process for extracting the non-volatile metals which they contain, and recovering the remainder of the reducing agent.

The heat contained in the glowing residue, and that which can be obtained from the combustion of the carbon thereof has not hitherto been directly utilized; and it is one of the objects of the present invention to do this.

Another object of the invention is to provide a process for separating the metals given off as vapors or oxids from the heated residue.

The figure of the accompanying drawing shows, by way of example, a vertical section of an apparatus by which the new process may be easily carried out.

The process is very simple. Directly below the muffle *a* there is a shaft like chamber *b* which at the top communicates with the bottom of the muffle. A fire-proof slide *c* serves to entirely cut off at will the communication between said chamber and muffle, and the displaceable grate *d* prevents the dropping of the new charge of the muffle into chamber while at the same time at one part the bottom of the muffle communication with the chamber is established.

After each reduction has been accomplished, the slide *c* and the grate *d* are pulled out entirely, and the residue is allowed to drop immediately into the chamber *b*. The grate is then replaced and a new charge introduced into the muffle. A blast of air or gas introduced through the channel *e* then passes through the residue and the heat of the residue and that generated by the combustion of the carbon thereof as well as the vapors from the residue are then conducted directly through the new charge.

As the vapors from the residue which may contain metals such as zinc lead and cadmium and (or) the oxids thereof pass through the new charge, the new charge acts somewhat as a filter and separates out a portion of the metallic vapor or oxid, that passing through being further separated in the condenser.

After the operation upon the residue is ended, the slide *c* is again pulled over the grate, so that communication between the chamber and muffle is absolutely cut off; and after the reduction of the new charge is completed, the operation is repeated.

This process has the following advantages:—

The intensity of the heat necessarily applied to the outer wall of the retort is decreased, and too sudden reduction of the ore is avoided.

The whole of the charge of the muffle is quickly brought to a temperature near the reduction point.

Not only is the heat obtainable from the combustion carbon in the residue utilized, without necessitating special preparation, but also the heat remaining in this residue.

A further advantage consists in the fact that by the passage of air or gas through the residue, the reduced metal contained therein (zinc, lead, cadmium) as well as the zinc, lead or cadmium present in the form of oxids, or combined with silicic or other acids, as a result of the reaction of the remaining reducing agent which burns in the current of air, passes either as a metallic vapor or as an oxid into the charge of the muffle which acts as a filter, and separates further in the condenser.

We claim as our invention:—

1. A process for utilizing the residue of zinc distillation, said process comprising placing a new charge of zinc ore above a glowing residue of a previous charge in which residue some of the flux remains; heating and reducing the new charge from the residue by passing a strong blast through the residue and thence through the new charge; and heating and distilling the new charge, and condensing the vapors thereof, while shut off from the drafts of gas.

2. A process for utilizing the residue of zinc distillation, said process comprising placing a new charge of zinc ore above a glowing residue of a previous charge, driving into the new charge metallic vapors from the residue by passing a strong blast through the residue and thence through the new charge and heating and distilling the new charge, and condensing the vapors thereof, while shut off from the drafts of gas.

3. A process for utilizing the residue of zinc distillation, said process comprising placing a new charge of zinc ore above a glowing residue of a previous charge; passing a blast of air through the residue and thence through the new charge; collecting and condensing the vapors, and then heating and distilling the new charge, and condensing the vapors thereof, while shut off from the drafts of gas.

4. A process for utilizing the residue of zinc distillation, said process comprising placing a new charge of zinc ore above a glowing residue of a previous charge; driving into the new charge metallic vapors and oxids from the residue by passing a strong blast through the residue and thence through the new charge, thereby partially filtering the blast by the new charge and retaining in the new charge a portion of said vapors and oxids; collecting and condensing the vapors and oxids and then heating and distilling the new charge, and condensing the vapors thereof, while shut off from the drafts of gas.

5. A process for utilizing the residue of zinc distillation, said process comprising placing a new charge of zinc ore above a glowing residue of a previous charge in which residue some of the flux remains; burning out the carbon; heating and reducing the new charge and driving into the new charge metallic vapors from the residue by passing a strong blast through the residue and thence through the new charge, thereby partially filtering the blast by the new charge and retaining in the new charge a portion of said vapors; collecting and condensing the vapors which pass through the new charge; inclosing and shutting off from the new charge access thereto of drafts of gas; and heating and distilling the new charge, and condensing the vapors thereof, while shut off from the drafts of gas.

In witness whereof we have hereunto set our hands in presence of two witnesses.

RUDOLF KÖHLER.
OTTO BALTIN.

Witnesses:
ERNST KATZ,
ERTEL FRIEDRICH NISHTANDER.